(12) United States Patent
Polyakov

(10) Patent No.: US 11,663,753 B1
(45) Date of Patent: May 30, 2023

(54) GENERATION OF FIELD PRODUCTIVITY MAPS

(71) Applicant: EOS DATA ANALYTICS, INC., Mountain View, CA (US)

(72) Inventor: Maxym Polyakov, Edinburgh (GB)

(73) Assignee: EOS DATA ANALYTICS, INC., Mountain View, CA (US)

(*) Notice: Subject to any disclaimer, the term of this patent is extended or adjusted under 35 U.S.C. 154(b) by 0 days.

(21) Appl. No.: 17/987,889

(22) Filed: Nov. 16, 2022

(51) Int. Cl.
*G06T 11/00* (2006.01)
*A01C 21/00* (2006.01)
*G06V 10/762* (2022.01)
*G06V 20/10* (2022.01)

(52) U.S. Cl.
CPC ............ *G06T 11/00* (2013.01); *A01C 21/007* (2013.01); *G06V 10/762* (2022.01); *G06V 20/188* (2022.01)

(58) Field of Classification Search
CPC .... G06T 11/00; G06V 10/762; G06V 20/188; A01C 21/007
See application file for complete search history.

(56) References Cited

U.S. PATENT DOCUMENTS

| | | | |
|---|---|---|---|
| 2014/0029844 A1* | 1/2014 | Padwick | G06T 7/0008 382/165 |
| 2017/0161584 A1* | 6/2017 | Guan | G06F 18/2148 |
| 2019/0059203 A1* | 2/2019 | Staples | A01B 79/005 |
| 2020/0125844 A1* | 4/2020 | She | G06V 10/764 |
| 2020/0250428 A1* | 8/2020 | Ahmed | G06V 10/56 |
| 2020/0364835 A1* | 11/2020 | Nagare | G06T 5/005 |

* cited by examiner

*Primary Examiner* — Syed Haider
(74) *Attorney, Agent, or Firm* — Georgiy L. Khayet

(57) ABSTRACT

A method for generating productivity maps is provided. The method includes receiving a user input including boundaries of a geographical area and a date range; selecting, from databases of earth observation providers, based on a first criterion concerning a cloud amount, a first plurality of first images corresponding to the date range and covering at least partially the geographical area; selecting, from the first plurality of first images, based on a second criterion concerning the cloud amount, a second plurality of second images; determining, based on the second plurality of second images and a statistical criterion, a value of a vegetation index for a pixel in the geographical area to generate a plurality of values of the vegetation index; dividing, based on the plurality of values of the vegetation index, the geographical area into a set of clusters; and generating a map featuring the set of clusters.

18 Claims, 9 Drawing Sheets

GENERATION OF FIELD PRODUCTIVITY MAPS

TECHNICAL FIELD

This disclosure generally relates to processing of earth observation (EO) imagery data. More particularly, this disclosure relates to methods and systems for generating productivity maps for agricultural fields.

BACKGROUND

Determining an amount of fertilizer for applying to an agricultural field is very important task in agricultural industry. The amount of fertilizer applied to the soil directly affects the end-of-season yield and profitability. The decisions with regard to fertilizer applications may be based on predicted weather conditions, previous yields, analysis of soil probes, and/or a geographic location of the field. However, these factors may be insufficient to determine optimized amounts for fertilizer for different areas of fields.

Some EO imagery data include information on levels of vegetation of geographical areas. The levels of vegetation can be used for robust evaluation for recommendation to applications of fertilizer. However, conventional systems for analyzing the satellite and other EO data do not provide convenient tools, such as, for example, generating differential productivity maps of agricultural fields that can be used by farmers and agricultural workers not experienced in software development or analysis of satellite data.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for generating productivity maps is provided. The method may commence with receiving, by a computing device via a user interface, a user input. The user input may include boundaries of a geographical area and a date range and predetermined number of clusters the field should be split. The method may continue with selecting, by the computing device, a first plurality of first images corresponding to the date range and at least partially covering the geographical area. The first plurality of first images may be selected from one or more databases of one or more EO providers based on a first criterion concerning a cloud amount. The method may further include selecting, by the computing device, a second plurality of second images from the first plurality of first images. The second plurality of second images may be selected based on a second criterion concerning the cloud amount. The method may further include determining, by the computing device, a value of a vegetation index for a pixel in the geographical area to generate a plurality of values of the vegetation index. The value of the vegetation index may be determined based on the second plurality of second images and a statistical criterion. The method may further include dividing, by the computing device, the geographical area into a set of clusters based on the plurality of values of the vegetation index. The method may continue with generating, by the computing device, a map featuring the set of clusters.

According to another embodiment of the present disclosure, a computing device for generating productivity maps is provided. The computing device may include a processor and a memory storing instructions that, when executed by the processor, configure the computing device to perform the following operations. The processor may be configured receive, via a user interface, a user input. The user input may include boundaries of a geographical area and a date range. The processor may be further configured to select, from one or more databases of one or more EO providers and based on a first criterion concerning a cloud amount, a first plurality of first images that correspond to the date range and at least partially cover the geographical area. The processor may be further configured to select, from the first plurality of first images and based on a second criterion concerning the cloud amount, a second plurality of second images. The processor may be configured to determine, based on the second plurality of second images and a statistical criterion, a value of a vegetation index for a pixel in the geographical area to generate a plurality of values of the vegetation index. The processor may be further configured to divide, based on the plurality of values of the vegetation index, the geographical area into a set of clusters and generate a map featuring the set of clusters.

According to yet another example embodiment of the present disclosure, the operations of the above-mentioned method are stored on a machine-readable medium comprising instructions, which, when implemented by one or more processors, perform the recited operations.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

DETAILED DESCRIPTION

Figure 1:
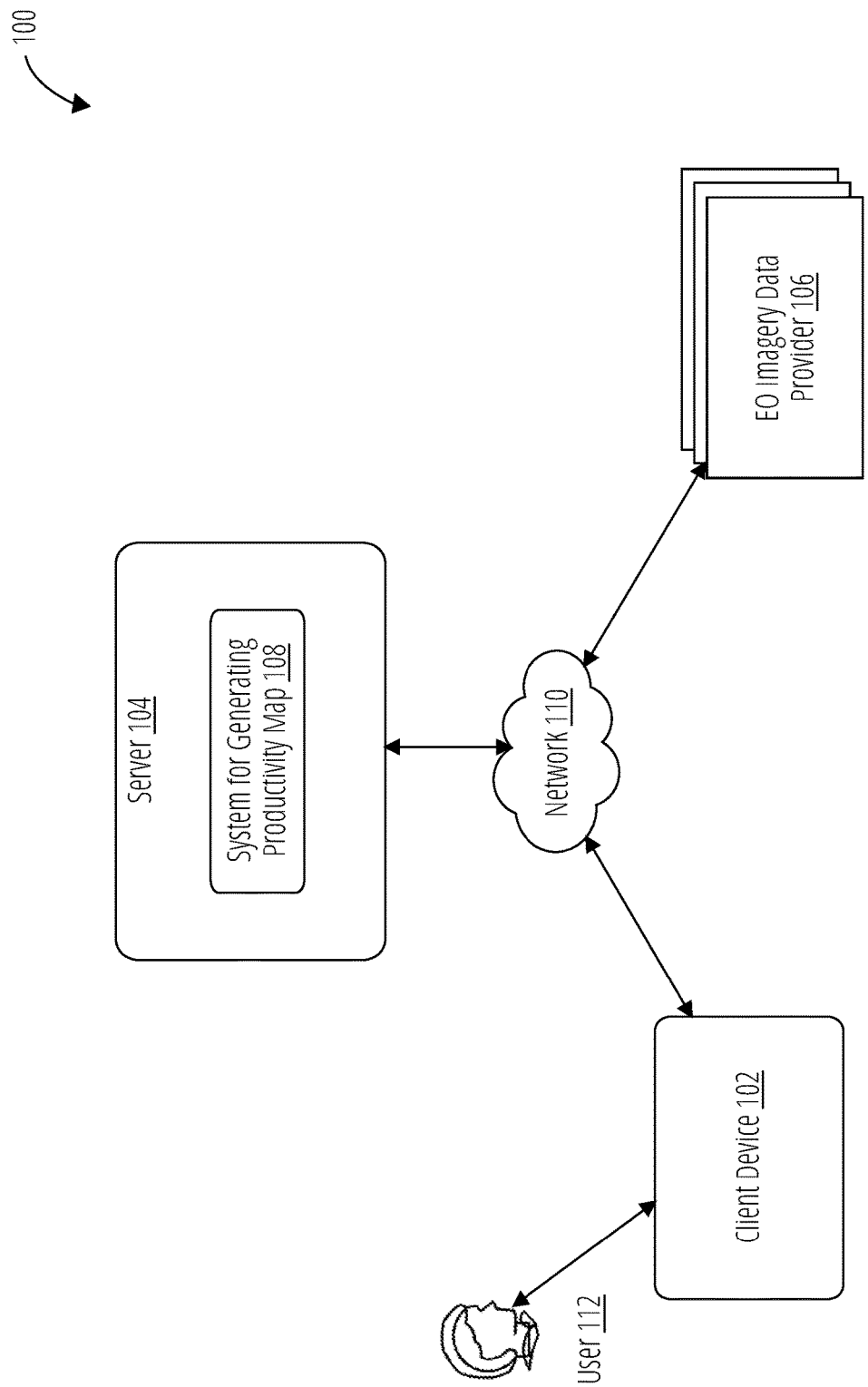
FIG. 1 is a block diagram of an example environment, in which systems and methods for generating productivity maps can be implemented.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure are concerned with systems and methods for generating productivity maps for crop growers and agricultural industry. Specifically, the systems and methods may use satellite EO images to determine productivity zones of an agricultural field (also referred herein to as an area of interest or geographical area) and provide a map showing the need for differentiated fertilization of the agricultural field. The map can be provided to a user on a web-optimized platform. The map can be generated based on vegetation indices determined based on satellite and other EO data that are received from EO providers for the selected agricultural field and selected year range.

In contrast to existing solutions for generating productivity maps, embodiments of the present disclosure allows users to select a vegetation index the productivity maps is generated on. In addition, unlike the existing solutions, embodiments described herein allow, during construction of productivity maps, to automatically select EO images with no or low cloudness.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows an example environment 100, in which systems and methods for generating productivity maps can be implemented. The environment 100 may include one or more client devices 102, a server 104, and one or more EO providers also referred to herein as EO imagery data providers 106. The server 104 may include a system 108 for generating productivity map, which is also referred herein as a system 108. The client devices 102, the server 104, and the EO imagery data providers 106 may be connected and communicate with each other via a data network shown as a network 110.

The client devices 102 may include a personal computer, a laptop computer, a tablet computer, a smartphone, a mobile phone, an Internet phone, a netbook, a multimedia player, a personal digital assistant, a server computer, a network storage computer, an entertainment system, an infotainment system, a television device, a display, or any other computing device having at least networking and data processing capabilities.

The server 104 may include a standalone computing device. In some other embodiments, the server 104 may be implemented as one or more cloud-based computing resources shared by multiple users. The cloud-based computing resources can include hardware and software available at a remote location and accessible over the network 110. The cloud-based computing resources can be dynamically re-allocated based on demand. The cloud-based computing resources may include one or more server farms/clusters including a collection of computer servers, which can be co-located with network switches and/or routers.

The network 110 may include any wired, wireless, or optical networks including, for example, the Internet, intranet, a Local Area Network (LAN), a Personal Area Network, a Wide Area Network (WAN), a Virtual Private Network, cellular phone networks (e.g., a Global System for Mobile (GSM) communications network, a packet switching communications network, a circuit switching communications network), Bluetooth® radio, an Ethernet network, an IEEE 802.11-based radio frequency network, a Frame Relay network, an Internet Protocol communications network, or any other data communication network utilizing physical layers, link layer capability, or network layers to carry data packets, or any combinations of the above-listed data networks.

The client devices 102 may be associated with one or more users 112. The users 112 may access the system 108 using one or more applications of the client devices 102 (for example, a web browser). The user 112 may provide, via a user interface associated with the client device 102, a user input. The user input may include boundaries of a geographical area and a date range.

The EO imagery data providers 106 may be configured to collect EO imagery data, e.g., from satellites or databases. The system 108 may be configured to receive the EO imagery data from the EO imagery data providers 106. The EO imagery data can be obtained using images taken from satellites, drones, and airplanes. The EO imagery data can be pre-processed by the EO imagery data providers 106. The pre-processing may include orthorectifying, mosaicking, tiling, and so forth. The EO imagery data may include optical data, multispectral data, hyperspectral data, synthetic aperture radar data, point cloud data, and so forth.

Figure 2:
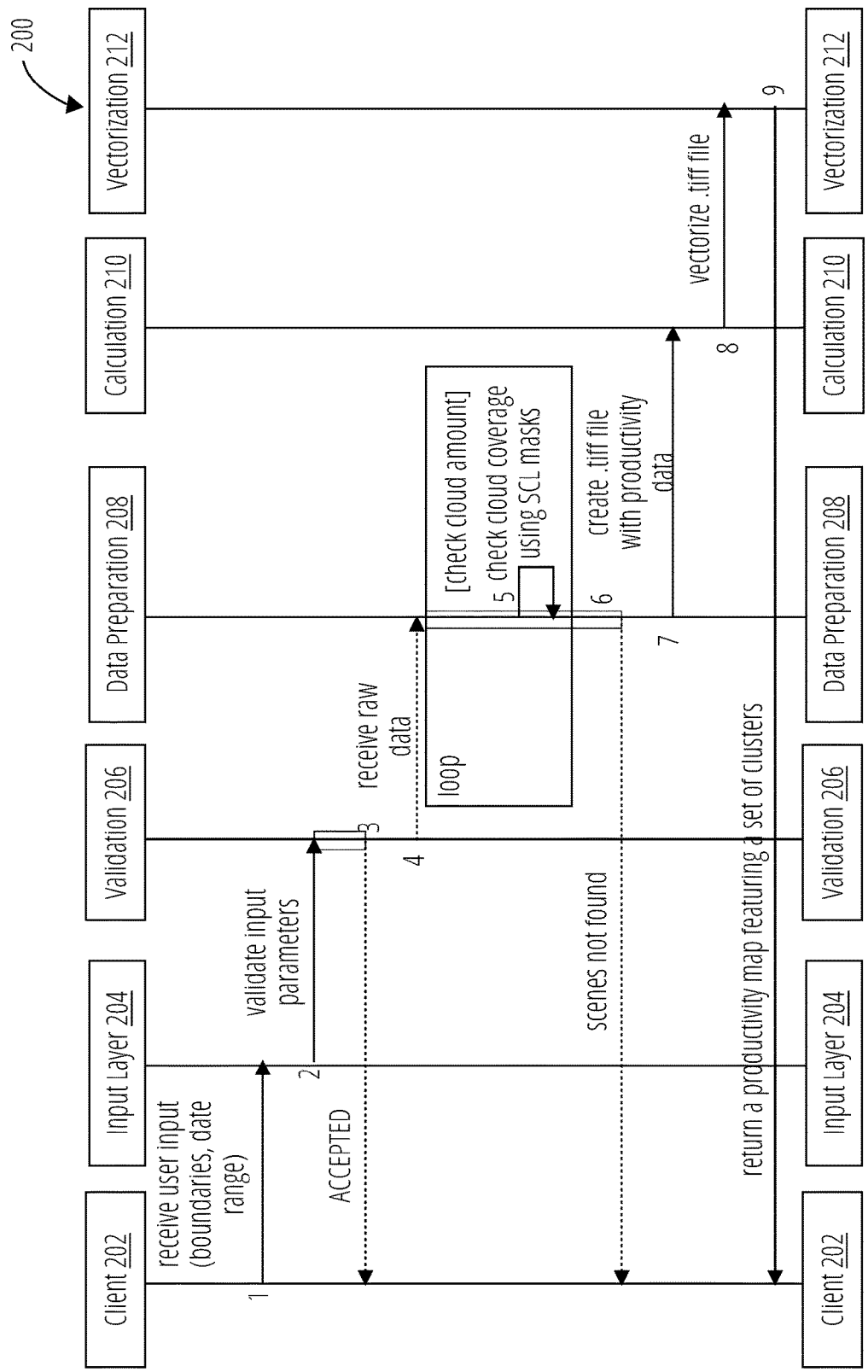
FIG. 2 is a workflow chart illustrating interactions of a system for generating productivity maps with a user, according to an example embodiment.

FIG. 2 is a workflow chart 200 illustrating interactions of a system 108 for generating productivity maps with a user, according to an example embodiment. In an example embodiment, the system 108 (shown in FIG. 1) may act as a crop monitoring web platform. In step 1 of generation of a productivity map, the system 108 may receive a user input from a user associated with a client device 102 that is shown as a client 202. The system 108 may receive the user input by an input layer 204 associated with the system 108. The user input may include boundaries of a geographical area and a date range. The geographical area may include an agricultural field or any other area of interest. In an example embodiment, the user may provide the coordinates of the geographical area. For example, the user may use a graphical user interface to draw the boundaries of the agricultural field on a map displayed via the user interface.

The date range selected by the user may include, for example, a range of dates that corresponds to a period that includes several years. The user input may further include a desired image format, such as a type of a vector file, in which the productivity map should be generated.

In step 2, the system proceeds to validation 206 of input parameters. Specifically, the system 108 determines whether the parameters received in the user input are valid. The validation 206 may include determining whether parameters of the geographical area are correct. The validation 206 may include determining that the geographical area complies with predetermined requirements. In an example embodiment, the validation 206 may include determining whether the geographical area is a polygon. Additionally, the determination that the geographical area is correct may include checking that there are no intersections inside the polygon; that is, that the boundary of the polygon does not intersects itself. The validation 206 may further include checking that the range of selected dates is not less than a year. The validation 206 may also include checking the type of the selected vector file.

If the parameters received in the user input are invalid, the system 108 proceeds to step 3. Step 3 includes sending a feedback message to the user to notify the user that the input data cannot be verified. The feedback message may include an error code and a short description of the error. Alternatively, if the system 108 determines that the input data are valid, the system 108 accepts the input data in step 3. The system 108 may send a feedback message to the user to notify the user that the input data have been accepted by the system 108.

In step 4, the system may select a first plurality of images that correspond to the date range and at least partially cover the geographical area. The first plurality of images may be selected from one or more databases of one or more EO providers. The selection of the first plurality of images may be performed based on a first criterion concerning a cloud amount. In an example embodiment, the selection of the first plurality of images may include verifying that a cloud amount in an image to be included in the first plurality of images does not exceed a predetermined threshold.

More specifically, the system 108 may receive row data (EO images) from EO providers and determine the cloud amount in the EO images that corresponds to the date range and at least partially covers the geographical area. Upon determining the cloud amount, the system 108 may select those EO images that have the cloud amount of, for example not more than 90%, and add these EO images to the first plurality of images. While adding the EO images to the first plurality of first images, the system 108 may automatically crop the EO images according to the boundaries of the geographical area. Step 4 is shown in detail in FIG. 3.

Figure 3:
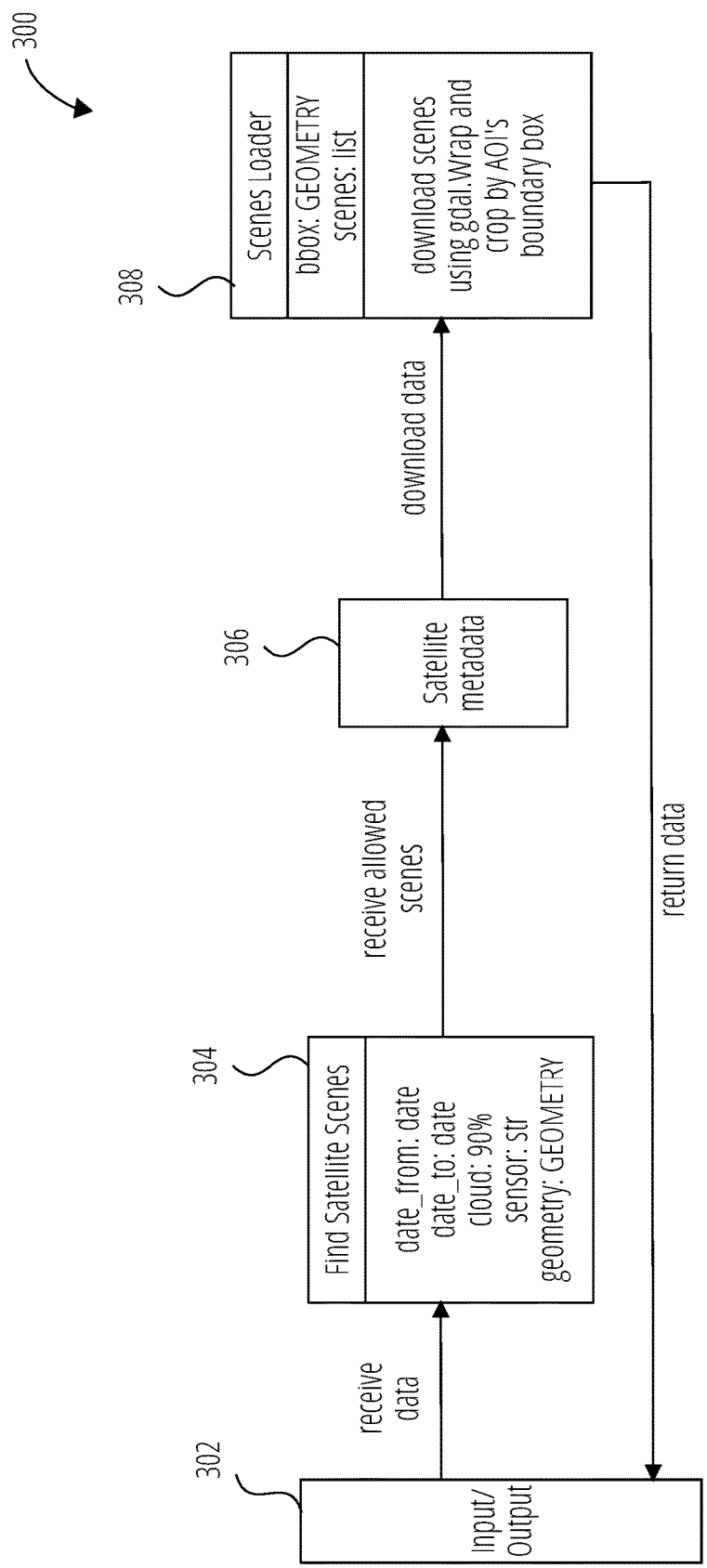
FIG. 3 is a block diagram illustrating downloading a plurality of EO images for processing, according to an example embodiment.

FIG. 3 is a block diagram 300 that illustrates downloading of satellite scenes for processing, according to an example embodiment. The system 108 may have an input/output block 302 configured to receive data associated with EO images of EO providers. Based on the data, a scene finder unit 304 may select EO images (allowed scenes) that correspond to the date range and at least partially cover the geographical area. The selection may be based on the following parameters of the EO images: a date range ('dates from' and 'dates to'), a percentage of the cloud amount (e.g., 90%) in EO images, a sensor type (panchromatic, green, red, near infrared, and so forth) associated with the satellite, and geometry of EO images.

The system 108 may access the satellite metadata 306 of the allowed scenes and download the allowed scenes. The downloading may be performed using a scenes loader unit 308 based on selected parameters, such as geometry of the scene and a list of scenes. The system 108 may download scenes using a gdal.wrap utility, which is a utility for image mosaicking, reprojection, and warping. The system 108 may also crop the scenes to the geometry (for example, a boundary box) of the geographical area. The system 108 may return the selected and processed scenes (as a first plurality of the images) via the input/output block 302.

Referring back to FIG. 2, upon completing step 4, the system 108 proceeds to step 5 to perform data preparation 208. In particular, the system 108 may select a second plurality of images from the first plurality of images. The selection of the second plurality of images may be performed based on a second criterion concerning the cloud amount. In an example embodiment, the selection of the second plurality of images may include verifying that a cloud amount in an intersection of the geographical area and an image does not exceed a predetermined threshold. Specifically, upon downloading of the first plurality of images, the system 108 may determine, for each of the first plurality of images, the cloud amount within the geographical area. The system may select, from the first plurality of images, the images that have the predetermined cloud amount. The predetermined cloud amount may be, for example, 0%. In an example embodiment, the system 108 may determine the cloud coverage (i.e., the cloud amount) of the images by applying scene classification layer (SCL)-based masks to the images. Step 5 is further illustrated in detail in FIG. 4.

Figure 4:
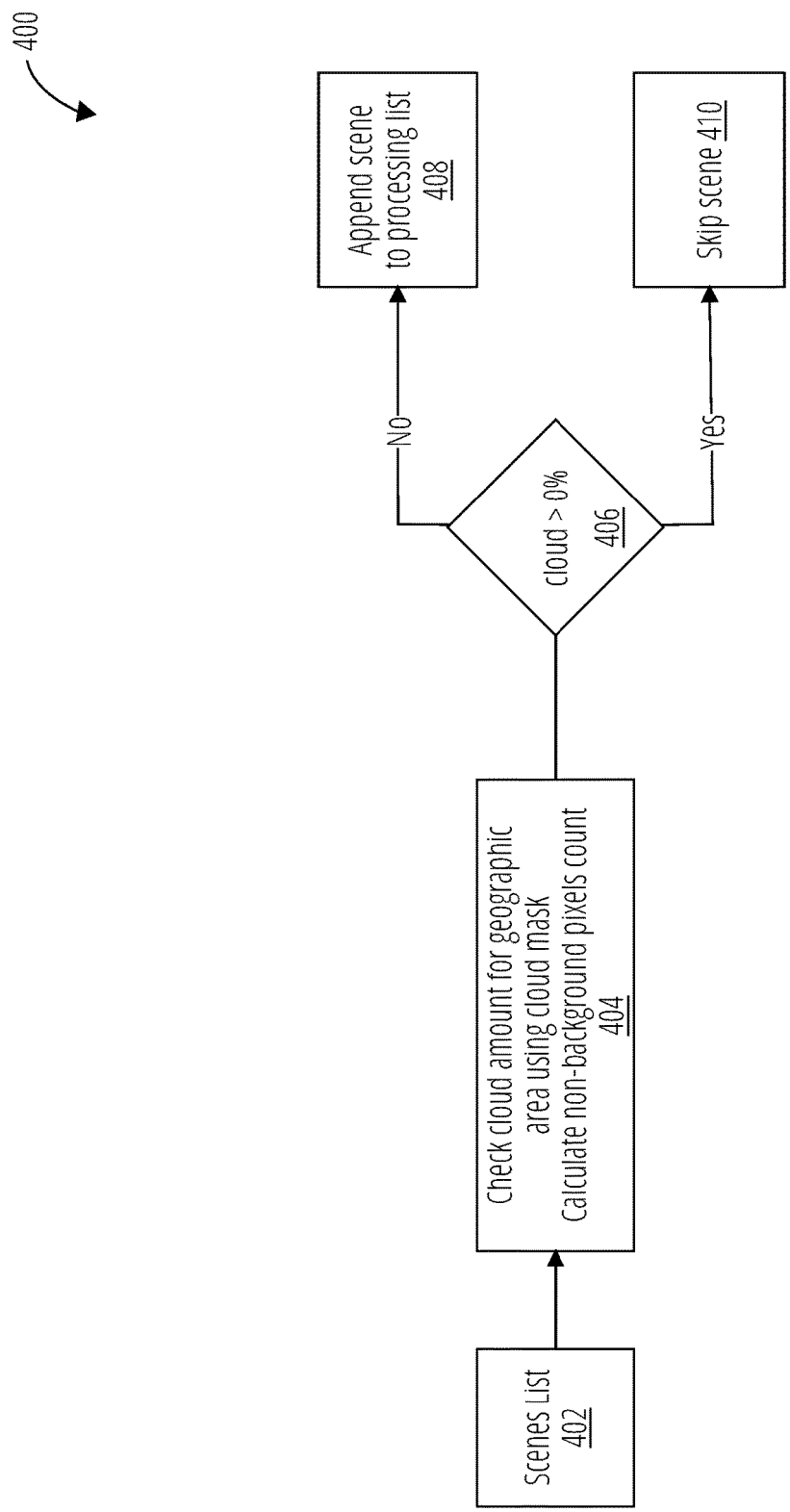
FIG. 4 is a workflow diagram illustrating checking a cloud amount in a geographical area, according to an example embodiment.

FIG. 4 is a workflow diagram 400 illustrating checking a cloud amount in a geographical area, according to an example embodiment. In block 402, the system may receive a scene list, i.e., the first plurality of images selected in step 4 as shown in FIG. 2. In block 404, the system may determine the cloud amount for the geographical area using a cloud mask and calculate a non-background pixels count. If the system 108 determines, in a decision block 406, that the cloud amount in an image does not exceed 0%, the system proceeds to block 408, in which the system 108 appends the scene (i.e., the image) to a processing list (second plurality of images). If the system 108 determines, in the decision block 406, that the cloud amount in an image exceeds 0%, the system 108 proceeds to block 410, in which the system skips the scene (i.e., the image).

The two-step selection of the images from scenes available from EO imagery data providers is needed for the following reasons. An area covered by an EO image of an example satellite may be about 100 square kilometers. An EO imagery data provider may indicate the cloud amount calculated for the whole EO image. The geographical area (area of interest selected by a user) may be ten times smaller than the area covered by the images captured by the satellite. If, for example, the cloud amount of the EO image is 30%, it cannot be stated for sure whether the geographical area (area of interest) lies within a clouded region of the EO image or not. For this reason, the two-step selection of the EO images is used. The first step includes selection of images with the cloud amount of less than 90% from the EO images available from the EO imagery data providers and cropping the images by boundaries of geographical area. The second step includes selection of further images with the cloud amount of 0% from the images selected and cropped at the first step.

Referring back to FIG. 2, in step 6, after the selection of the second plurality of images, the system 108 may verify that the second plurality of images covers the geographical area. Based on the determination that the verification has failed, the system 108 may provide, to the user, an error message on absence of relevant data in the database. Therefore, if the second plurality of images does not cover the geographical area, the system 108 may send a message to the user informing that scenes (i.e., the relevant data) are not found.

In step 7, the system 108 proceeds to calculation 210 of vegetation indices. Specifically, the system 108 performs radiometric correction of the selected second plurality of images, if needed, depending on the level of processing of data received from the satellite. Upon optional radiometric correction, the second plurality of images are used by the system 108 for generating a productivity map.

The generation of the productivity map may commence with determining a value of a vegetation index for each pixel in the geographical area (area of interest-AOI) to generate a plurality of values of the vegetation index. The determination of the value of the vegetation index may be performed based on the second plurality of images and a statistical criterion. The vegetation index may include one of the following: a Normalized Difference Vegetation Index (NDVI), a Normalized Difference Moisture Index (NDMI), a Modified Soil Adjusted Vegetation Index (MSAVI), a Red-Edge Chlorophyll Index (RECI), a Normalized Difference Water Index (NDWI), a Leaf Area Index (LAI), and so forth.

In an example embodiment, the determination of the value of the vegetation index for a pixel in the geographical area may include selecting, based on the second plurality of images, a subset of images that correspond to the pixel and different dates of the date range. The system 108 may proceed to determining, based on the subset of images, a set of historical values of the vegetation index. The historical values may correspond to the different dates. The system may further exclude, from the set of historical values, at least one value that exceeds a predetermined percentile.

Figure 5:
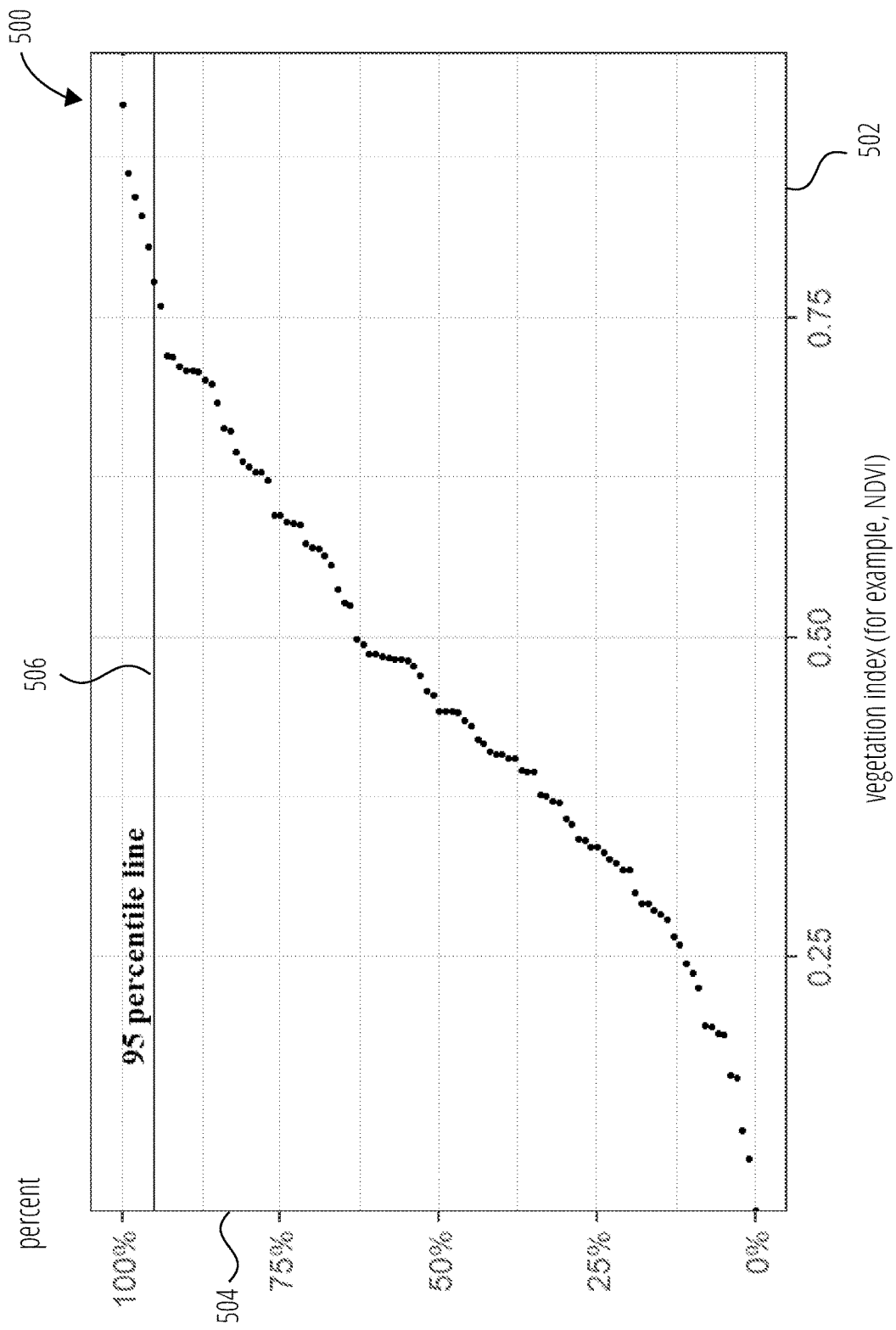
FIG. 5 is a schematic diagram illustrating exclusion of values of vegetation indices that exceed a predetermined percentile, according to an example embodiment.

FIG. 5 is a schematic diagram 500 that illustrates excluding of values of a vegetation index that exceed a predetermined percentile. In an example embodiment, the system 108 may determine the maximum value of the vegetation index for each pixel in an image of each year under 95 percentile. FIG. 5 shows a vegetation index axis 502 (for example, an NDVI), a percent axis 504, and a 95percentile line 506. For example, if there is a sample of a hundred of values of the NDVI, the 95th percentile value is the 95th value in this sample after sorting the sample in ascending order.

The values that exceed the 95 percentile line 506 may be excluded. The exclusion of values that exceed the 95 percentile line 506 is needed to remove the value outliers, i.e., exclude the possible maximum extreme values of the index that may affect the map. For example, if ten cloudless images for year 2019 are available for a geographical area, there should be ten values of the vegetation index for each pixel. The system 108 discards values that go after the 95th percentile and takes the maximum value in the remaining set of values. This is performed for each pixel in the selected geographical area. Therefore, upon excluding the at least one value that exceeds the predetermined percentile, the system 108 may determine a maximum value in the rest of the set of historical values.

The above-mentioned step is performed for each year of the date range selected by the user. For example, when images of the geographical area for five years (for example, 2017, 2018, 2019, 2020, 2021) are available, the system determines, for each pixel, five maximum values in accordance with the number of years (n=5). These five values are then averaged.

Figure 6:
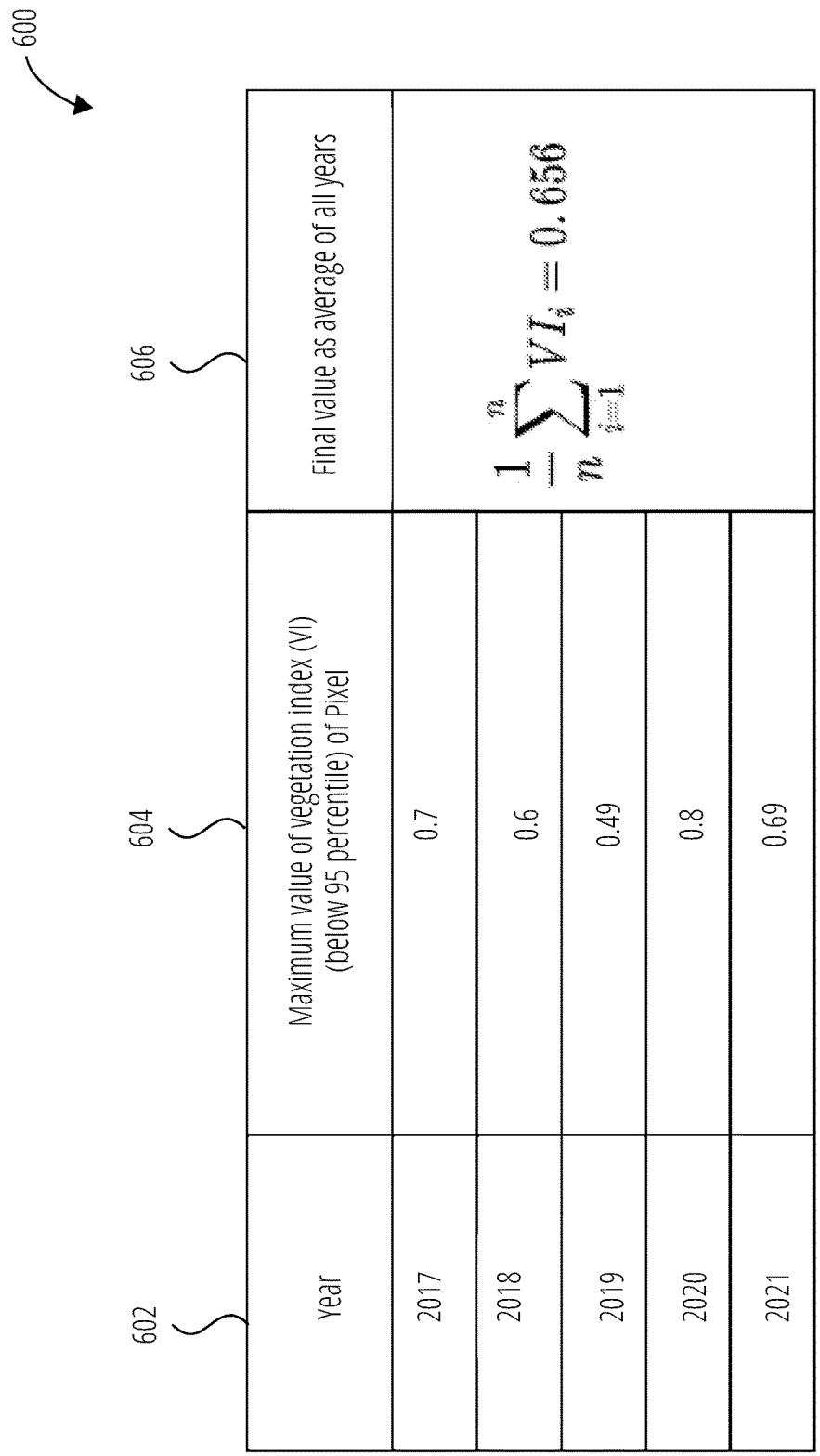
FIG. 6 is a table illustrating calculation of a final value of a vegetation index for a pixel, according to an example embodiment.

FIG. 6 is a table 600 illustrating calculation of a final value of a vegetation index for a pixel, according to an example embodiment. The table 600 includes a column 602 showing five years (2017, 2018, 2019, 2020, and 2021), a column 604 showing a maximum value of a vegetation index (below 95 percentile) for a pixel, and a column 606 showing a final value of the vegetation index (VI) as an average of vegetation indices for all years. The final value may be calculated by the formula:

$$\frac{1}{n}\sum_{i=1}^{n} VI_i = 0.656.$$

Referring back to FIG. 2, upon determining of the final values of the vegetation index for each pixel, the system 108 may divide the geographical area into a set of clusters. The dividing may be performed based on the plurality of values of the vegetation index using the k-means clusterization. Upon dividing the geographical area into the set of clusters, the system may generate a map featuring the set of clusters. The map is also referred herein to as a productivity map.

Step 7 further includes creating a .tiff file of the map that includes cluster indices (productivity data) and a spatial resolution corresponding to the original geographical area.

In step 8, the system proceeds to vectorization 212. Specifically, for ease of use on web platforms, the system 108 creates a vector file that corresponds to the .tiff file of the map. The vector file may have the following properties: a cluster index, an average value of the vegetation index, an area of the cluster in square meters, and so forth. In an example embodiment, the map may be generated according to the desired image format received from the user in the user input.

As used herein, a vegetation index is an index related to vegetation parameters in a given pixel of an image and is calculated based on operations with different spectral ranges of data obtained from remote sensing. The term "vegetation index of a cluster" means an average value of the vegetation index in the cluster. In particular, the system 108 clusterizes the image, obtains clusters, and calculates the average value of vegetation index for each cluster. In some embodiments, the system 108 may calculate different statistical distribution metrics of the vegetation index for each cluster, such as a standard deviation, a variation, and so forth. In certain embodiments, the clusterization can be performed based on different statistical distribution metrics of the vegetation index.

Figure 7:
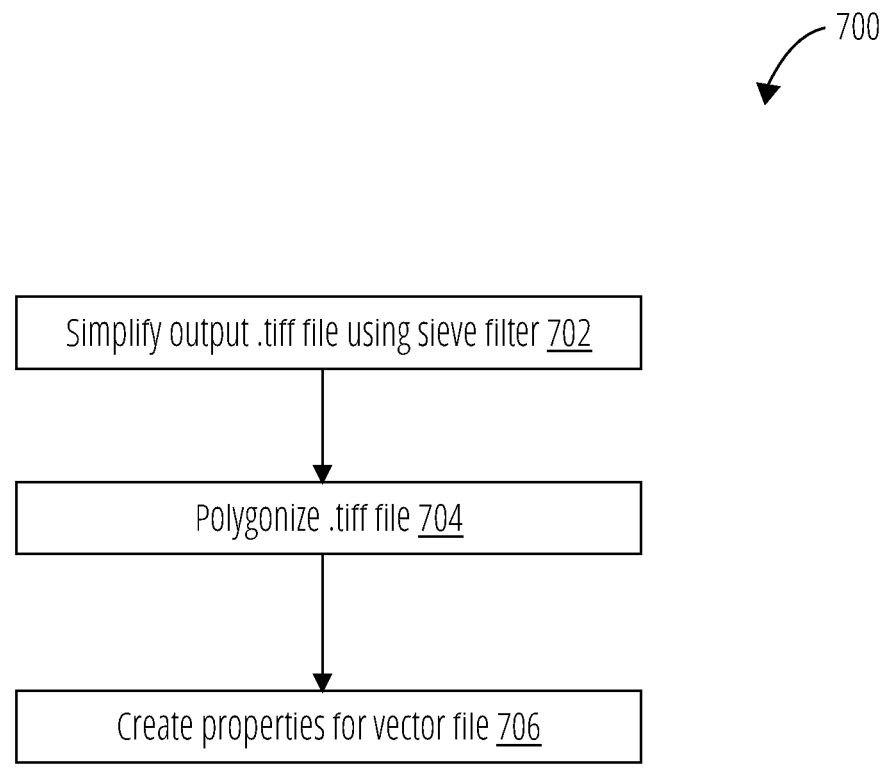
FIG. 7 is a workflow diagram that shows processing of a .tiff file, according to an example embodiment.

Step 8 is further shown in detail in FIG. 7. FIG. 7 is a workflow diagram 700 showing processing of a .tiff file, according to an example embodiment. In step 702, the system 108 may simplify the output .tiff file using a sieve filter. In step 704, the system 108 may polygonize the .tiff file. In particular, the polygonization may be performed by dividing the geographical area into a set of clusters. The dividing may be performed based on the plurality of values of the vegetation index. In step 706, the system 108 may create properties for the vector file and create the vector file that corresponds to the .tiff file of the map.

Referring back to FIG. 2, in step 9, upon completion of all processing steps, the system 108 may send the productivity map to the user. In an example embodiment, the system 108 may send a message that includes one or more links to the final results of generation of the map. In an example embodiment, the system 108 may generate a report that includes an average value of the vegetation index of a cluster of the set of clusters and an area of the cluster. The system 108 may provide, to the user, an Internet Protocol address for downloading the map and the report.

Therefore, the user may receive the map that includes several regions (i.e., clusters) and a vegetation index is shown for each region of the map. The user may review the regions to determine the productivity of plants on the geographical area based on the vegetation index that illustrates the level of vegetation of the plants. Thus, by illustrating the vegetation indices of the regions, the map may show some regions (parts of geographical area) that have higher productivity and some regions of the field that have lower productivity. The user may use this information to decide to which regions a fertilizer should be introduced and select the type and the amount of the fertilizer needed for each region with low productivity.

Figure 8:
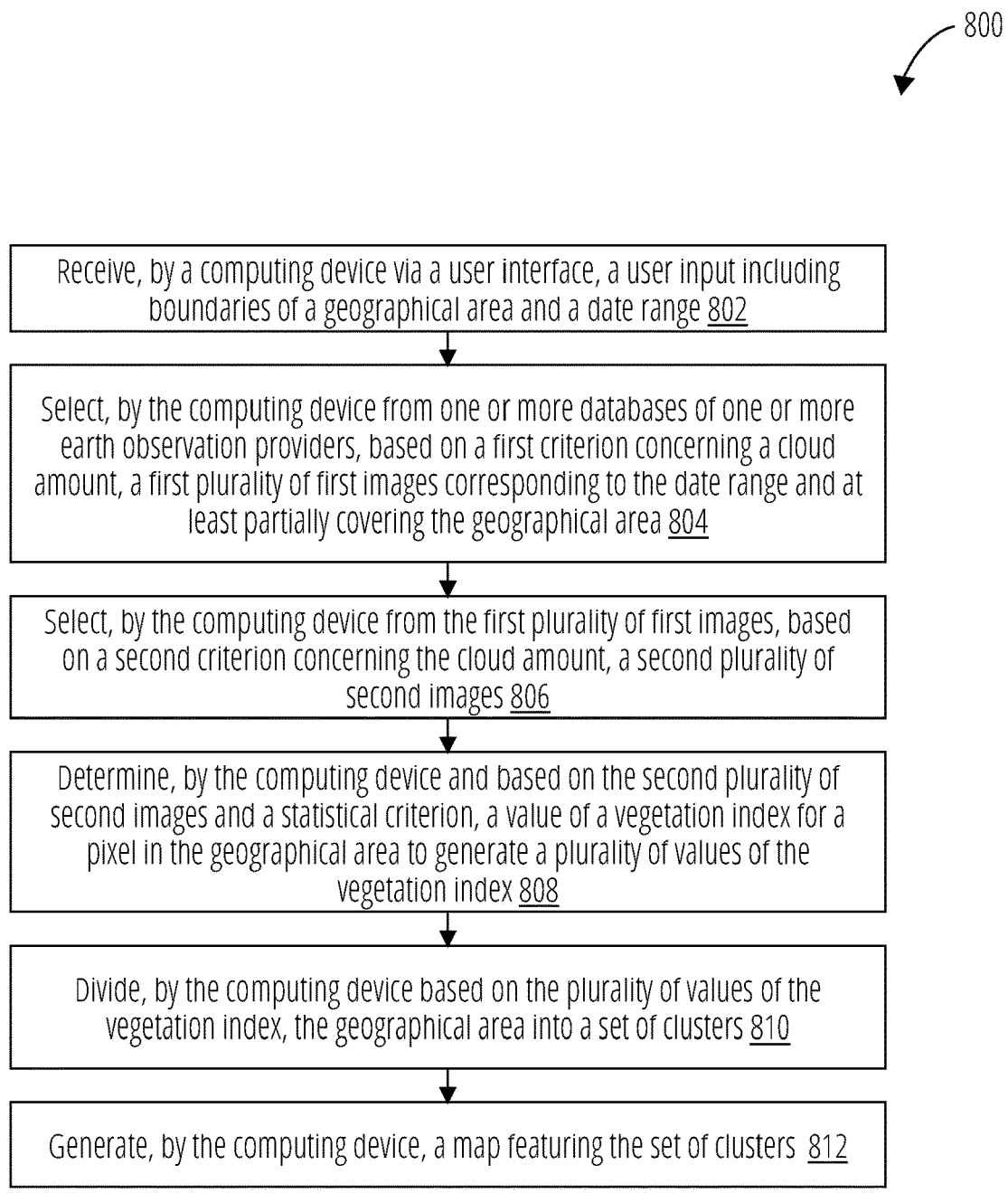
FIG. 8 is a flow chart of a method for generating productivity maps, according to an example embodiment.

FIG. 8 is a flow chart of a method 800 for generating productivity maps, according to an example embodiment. In some embodiments, the operations may be combined, performed in parallel, or performed in a different order. The method 800 may also include additional or fewer operations than those illustrated. The method 800 may be performed by processing logic that may comprise hardware (e.g., decision making logic, dedicated logic, programmable logic, and microcode), software (such as software run on a general-purpose computer system or a dedicated machine), or a combination of both.

The method 800 may commence with receiving, by a computing device via a user interface, a user input in block 802. The user input may include boundaries of a geographical area and a date range. In some embodiments, the user input may include a desired image format and a number of clusters the geographical area needs to be divided into. The user input may be received from a user associated with the computing device.

In block 804, the method 800 may include selecting, by the computing device, a first plurality of first images that correspond to the date range and at least partially cover the geographical area. The first plurality of first images may be selected from one or more databases of one or more EO providers. Furthermore, the first plurality of first images may be selected based on a first criterion concerning a cloud amount. In an example embodiment, the selection of the first plurality of first images based on the first criterion concerning the cloud amount may include verifying that a cloud amount in a first image of the first plurality of first images does not exceed a first predetermined threshold.

In block 806, the method 800 may continue with selecting, by the computing device, a second plurality of second images from the first plurality of first images. The second plurality of second images may be selected based on a second criterion concerning a cloud amount. In an example embodiment, the selection of the second plurality of second images based on the second criterion concerning the cloud amount may include verifying that a cloud amount in an intersection of the geographical area and a second image of the second plurality of second images does not exceed a second predetermined threshold. In some example embodiments, the second predetermined threshold may be zero.

In an example embodiment, after the selection of the second plurality of second images, the method 800 may optionally include verifying that the second plurality of second images covers the geographical area. Based on the determination that the verification has failed, an error message on absence of relevant data in the database may be provided to the user.

In block 808, the method 800 may include determining, by the computing device and based on the second plurality of second images and a statistical criterion, a value of a vegetation index for a pixel in the geographical area to generate a plurality of values of the vegetation index. In an example embodiment, the determination of the value of the vegetation index for the pixel in the geographical area may include selecting, from the second plurality of second images, a subset of images that correspond to the pixel and different dates of the date range. The determination of the value of the vegetation index may continue with determining, based on the subset of images, a set of historical values of the vegetation index. The historical values may correspond to the different dates. The determination of the value of the vegetation index may further include excluding, from the set of historical values, at least one value that exceeds a predetermined percentile and determining a maximum value in the rest of the set of historical values.

The vegetation index may include one of the following: an NDVI, an NDMI, an MSAVI, an RECI, an NDWI, an LAI, and so forth.

In block 810, the method 800 may continue with dividing, by the computing device, the geographical area into a set of clusters. The geographical area may be divided into the set of clusters based on the plurality of values of the vegetation index.

In block 812, the method 800 may include generating, by the computing device, a map featuring the set of clusters. The number of clusters can be provided via the user input. If the user input does not include the number of clusters, then the number of clusters can be set to a default value, for example, three. In an example embodiment, the map may be generated according to the desired image format received from the user in the user input.

The method 800 may further optionally include generating a report that includes a statistical parameter of the vegetation index of a cluster of the set of clusters and an area of the cluster. The statistical parameter may include an average value of the vegetation index, a standard deviation of the vegetation index, a variation of the vegetation index, and so forth. The method 800 may continue with providing, to the user, an internet address for downloading the map and the report.

In further embodiments, the productivity maps can be generated using synthetic aperture radar (SAR) data. In these embodiments, the process of generating productivity maps can be similar to those described in FIG. 2 and FIG. 8, except for the steps of selecting images based on cloud amounts. Specifically, steps 4 and 5 can be omitted in the workflow described in FIG. 2 and steps 804 and 806 can be omitted in method 800 described in FIG. 8.

Figure 9:
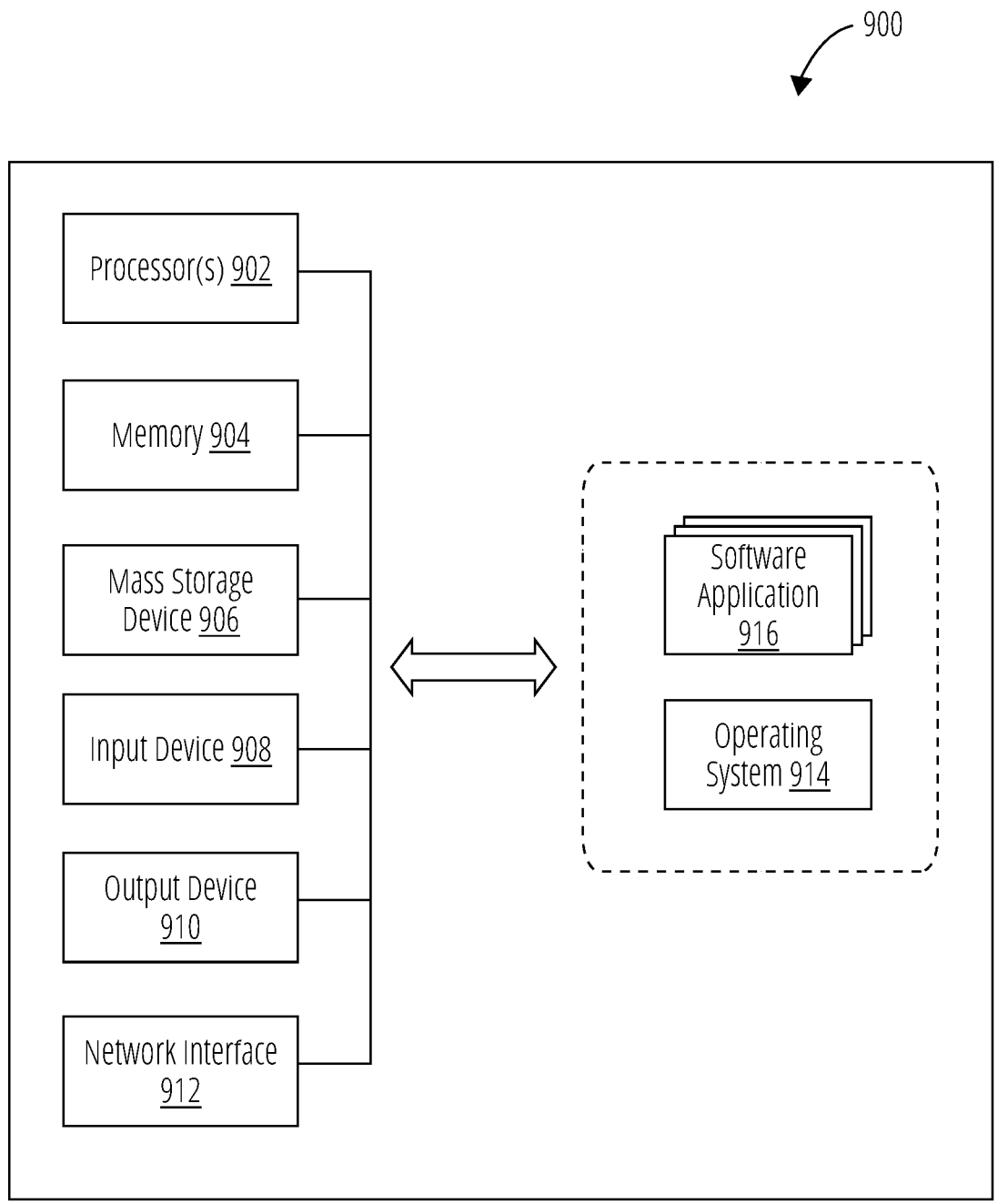
FIG. 9 is a high-level block diagram illustrating an example computer system, within which a set of instructions for causing a machine to perform any one or more of the methodologies discussed herein can be executed.

FIG. 9 is a high-level block diagram illustrating an example computer system 900, within which a set of instructions for causing the machine to perform any one or more of the methodologies discussed herein can be executed. The computer system 900 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 900 is an example of a system for generating productivity maps or a computing device that includes a processor and a memory storing instructions that, when executed by the processor, cause the processor to generate productivity maps. Notably, FIG. 9 illustrates just one example of the computer system 900 and, in some embodiments, the computer system 900 may have fewer elements/modules than shown in FIG. 9 or more elements/modules than shown in FIG. 9.

The computer system 900 may include one or more processor(s) 902, a memory 904, one or more mass storage devices 906, one or more input devices 908, one or more output devices 910, and a network interface 912. The processor(s) 902 are, in some examples, configured to implement functionality and/or process instructions for execution within the computer system 900. For example, the processor(s) 902 may process instructions stored in the memory 904 and/or instructions stored on the mass storage devices 906. Such instructions may include components of an operating system 914 or software applications 916. The computer system 900 may also include one or more additional components not shown in FIG. 9.

The memory 904, according to one example, is configured to store information within the computer system 900 during operation. The memory 904, in some example embodiments, may refer to a non-transitory computer-readable storage medium or a computer-readable storage device. In some examples, the memory 904 is a temporary memory, meaning that a primary purpose of the memory 904 may not be long-term storage. The memory 904 may also refer to a volatile memory, meaning that the memory 904 does not maintain stored contents when the memory 904 is not receiving power. Examples of volatile memories include random access memories (RAM), dynamic random access memories (DRAM), static random access memories (SRAM), and other forms of volatile memories known in the art. In some examples, the memory 904 is used to store program instructions for execution by the processor(s) 902. The memory 904, in one example, is used by software (e.g., the operating system 914 or the software applications 916). Generally, the software applications 916 refer to software Applications suitable for implementing at least some operations of the methods for generating productivity maps as described herein.

The mass storage devices 906 may include one or more transitory or non-transitory computer-readable storage media and/or computer-readable storage devices. In some embodiments, the mass storage devices 906 may be configured to store greater amounts of information than the memory 904. The mass storage devices 906 may further be configured for long-term storage of information. In some examples, the mass storage devices 906 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 908, in some examples, may be configured to receive input from a user through tactile, audio, video, or biometric channels. Examples of the input devices 908 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 900, or components thereof.

The output devices 910, in some examples, may be configured to provide output to a user through visual or auditory channels. The output devices 910 may include a video graphics adapter card, a liquid crystal display monitor, a light emitting diode (LED) monitor, an organic LED monitor, a sound card, a speaker, a lighting device, a LED, a projector, or any other device capable of generating output that may be intelligible to a user. The output devices 910 may also include a touchscreen, a presence-sensitive display, or other input/output capable displays known in the art.

The network interface 912 of the computer system 900, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi networks®, among others. The network interface 912 may be a network interface card, such as an Ethernet card, an optical transceiver, a radio frequency transceiver, or any other type of device that can send and receive information.

The operating system 914 may control one or more functionalities of the computer system 900 and/or components thereof. For example, the operating system 914 may interact with the software applications 916 and may facilitate one or more interactions between the software applications 916 and components of the computer system 900. As shown in FIG. 9, the operating system 914 may interact with or be otherwise coupled to the software applications 916 and components thereof. In some embodiments, the software applications 916 may be included in the operating system 914. In these and other examples, virtual modules, firmware, or software may be part of the software applications 916.

Thus, systems and methods for generating productivity maps have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
receiving, by a computing device via a user interface, a user input including boundaries of a geographical area and a date range;
selecting, by the computing device from one or more databases of one or more earth observation providers, based on a first criterion concerning a cloud amount, a first plurality of first images corresponding to the date range and at least partially covering the geographical area;
selecting, by the computing device from the first plurality of first images, based on a second criterion concerning the cloud amount, a second plurality of second images;
determining, by the computing device and based on the second plurality of second images and a statistical criterion, a value of a vegetation index for a pixel in the geographical area to generate a plurality of values of the vegetation index, wherein the determining the value of the vegetation index for the pixel in the geographical area includes:
selecting, based on the second plurality of second images, a subset of images corresponding to the pixel and different dates of the date range;
determining, based on the subset of images, a set of historical values of the vegetation index, the historical values corresponding to the different dates;
excluding, from the set of historical values, at least one value exceeding a predetermined percentile; and
determining a maximum value in the rest of the set of historical values;
dividing, by the computing device, based on the plurality of values of the vegetation index, the geographical area into a set of clusters; and
generating, by the computing device, a map featuring the set of clusters.

2. The method of claim 1, wherein the selecting, based on the first criterion concerning the cloud amount, the first plurality of first images includes verifying that the cloud amount in a first image of the first plurality of first images does not exceed a predetermined threshold.

3. The method of claim 1, wherein the selecting, based on the second criterion concerning the cloud amount, the second plurality of second images includes verifying that the cloud amount in an intersection of the geographical area and a second image of the second plurality of second images does not exceed a predetermined threshold.

4. The method of claim 3, wherein the predetermined threshold is zero.

5. The method of claim 1, further comprising generating a report including a statistical parameter of the vegetation index of a cluster of the set of clusters and an area of the cluster.

6. The method of claim 5, further comprising providing, to a user, an internet address for downloading the map and the report.

7. The method of claim 1, wherein the user input includes:
   a desired image format and the map is generated according to the desired image format; and
   a number of clusters in the set of the clusters.

8. The method of claim 1, wherein the vegetation index includes one of the following: a Normalized Difference Vegetation Index, a Normalized Difference Moisture Index, a Modified Soil Adjusted Vegetation Index, a Red-Edge Chlorophyll Index, a Normalized Difference Water Index, and a Leaf Area Index.

9. The method of claim 1, further comprising, after the selecting the second plurality of second images:
   verifying that the second plurality of second images covers the geographical area; and
   based on the determination that the verification has failed, providing, to a user, an error message on absence of relevant data in the database.

10. A computing device comprising:
    a processor; and
    a memory storing instructions that, when executed by the processor, configure the computing device to:
    receive, via a user interface, a user input including boundaries of a geographical area and a date range;
    select, from one or more databases of one or more earth observation providers and based on a first criterion concerning a cloud amount, a first plurality of first images corresponding to the date range and at least partially covering the geographical area;
    select, from the first plurality of first images and based on a second criterion concerning the cloud amount, a second plurality of second images;
    determine, based on the second plurality of second images and a statistical criterion, a value of a vegetation index for a pixel in the geographical area to generate a plurality of values of the vegetation index, wherein the determining the value of the vegetation index for the pixel in the geographical area includes:
    selecting, based on the second plurality of second images, a subset of images corresponding to the pixel and different dates of the date range;
    determining, based on the subset of images, a set of historical values of the vegetation index, the historical values corresponding to the different dates;
    excluding, from the set of historical values, at least one value exceeding a predetermined percentile; and
    determining a maximum value in the rest of the set of historical values;
    divide, based on the plurality of values of the vegetation index, the geographical area into a set of clusters; and
    generate a map featuring the set of clusters.

11. The computing device of claim 10, wherein the selecting, based on the first criterion concerning the cloud amount, the first plurality of first images includes verifying that the cloud amount in a first image of the first plurality of first images does not exceed a predetermined threshold.

12. The computing device of claim 10, wherein the selecting, based on the second criterion concerning the cloud amount, the second plurality of second images includes verifying that the cloud amount in an intersection of the geographical area and a second image of the second plurality of second images does not exceed a predetermined threshold.

13. The computing device of claim 12, wherein the predetermined threshold is zero.

14. The computing device of claim 10, wherein the instructions further configure the computing device to generate a report including a statistical parameter of the vegetation index of a cluster of the set of clusters and an area of the cluster.

15. The computing device of claim 14, wherein the instructions further configure the computing device to provide, to a user, an internet address for downloading the map and the report.

16. The computing device of claim 10, wherein the user input includes:
    a desired image format and the map is generated according to the desired image format; and
    a number of clusters in the set of clusters.

17. The computing device of claim 10, wherein the vegetation index includes one of the following: a Normalized Difference Vegetation Index, a Normalized Difference Moisture Index, a Modified Soil Adjusted Vegetation Index, a Red-Edge Chlorophyll Index, a Normalized Difference Water Index, and a Leaf Area Index.

18. A non-transitory computer-readable storage medium, the non-transitory computer-readable storage medium including instructions that, when executed by a computer, cause the computer to:
    receive, via a user interface, a user input including boundaries of a geographical area and a date range;
    select, from one or more databases of one or more earth observation providers and based on a first criterion concerning a cloud amount, a first plurality of first images corresponding to the date range and at least partially covering the geographical area;
    select, from the first plurality of first images and based on a second criterion concerning the cloud amount, a second plurality of second images;
    determine, based on the second plurality of second images and a statistical criterion, a value of a vegetation index for a pixel in the geographical area to generate a plurality of values of the vegetation index, wherein the determining the value of the vegetation index for the pixel in the geographical area includes:
    selecting, based on the second plurality of second images, a subset of images corresponding to the pixel and different dates of the date range;
    determining, based on the subset of images, a set of historical values of the vegetation index, the historical values corresponding to the different dates;
    excluding, from the set of historical values, at least one value exceeding a predetermined percentile; and
    determining a maximum value in the rest of the set of historical values;
    divide, based on the plurality of values of the vegetation index, the geographical area into a set of clusters; and
    generate a map featuring the set of clusters.

* * * * *